Sept. 13, 1960

J. E. DORNFELD 2,952,805

CUP-TYPE CAPACITOR

Filed May 9, 1957

INVENTOR:
JOHN DORNFELD
BY
Connolly and Hutz
ATTORNEYS

United States Patent Office 2,952,805
Patented Sept. 13, 1960

2,952,805
CUP-TYPE CAPACITOR

John E. Dornfeld, Milwaukee, Wis., assignor to Sprague Electric Company, North Adams, Mass., a corporation of Massachusetts Filed May 9, 1957, Ser. No. 658,131

5 Claims. (Cl. 317—261)

This invention relates to improvements in electrical capacitors of the cup-enclosed type heretofore used to decrease self-inductance of the leads and reduce length of the paths across the capacitor plates.

It is one object of the present invention to provide an electrical capacitor of the cup-enclosed type having a smaller number of plates and smaller over-all dimensions, and in which fewer manufacturing operations are required than heretofore for a capacitor of given capacitance value.

Another object of the invention is to provide an electric capacitor employing a plurality of stacked metal-coated ceramic plates inclosed in a metal cup and of which the "active" plates are free from perforations, thereby reducing cracking and warping of the plates and other weaknesses in plates tending to cause spoilage thereof during manufacture, and increasing the useful area of such plates.

Another object of the invention is to provide an electric capacitor of the cup-enclosed type in which the corresponding metal coatings of the plates are connected into sets more easily and simply than heretofore and in which such connections also coact in producing a stacked-plate unit having increased resistance to damage due to shocks and vibrations.

Advantages and objects other than those above set forth will be apparent from the following description when read in connection with the accompanying drawing in which.

Figure 3:
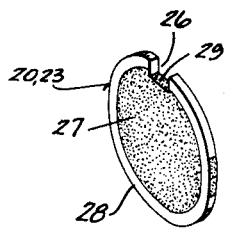
Figures 3 and 4 are views of two sides of one of the metal coated plates forming the active portions of the present capacitor.
Figure 4:
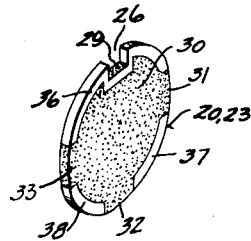

Referring to the drawing by numerals, a container or cup has a side wall 10 and a bottom 11 providing an annular shoulder 12 extending inwardly from the side wall. A mounting stud 13 is fixed centrally in the cup bottom and a circuit terminal 16 is fixed to the cup bottom and extends laterally therefrom. Four so-called "active" plates 20, 21, 22 and 23 for producing a capacitance effect, are made of a good dielectric material such as ceramic, in generally disk-like form and of substantially the internal diameter of the cup 10 above its shoulder. Each of the active plates (see Figures 3 and 4) has a notch 26 in an edge but is otherwise a solid plate. The plates 20–23 have metal coatings 27 on one side with a marginal portion 28 of the plate left uncoated, and a strip of the coating 27 extends into the notch as indicated at 29. The other sides of the plates 20–23 are provided with metal coatings 30 extending over the edges of the plates to provide coating strips 31, 32 and 33, with marginal portions 36, 37 and 38 left uncoated.

Figure 5:
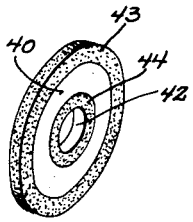
Figure 5 is a perspective view of an end member before a circuit terminal is attached thereto.

Two generally similar insulating end members 40 and 41 are "inactive" so far as capacitance effect is concerned and (see Figures 2 and 5) are each provided with a central aperture 42. The end insulators have one annular metal coating 43 about the periphery and over the edge of the member and another annular metal coating 44 about the central aperture through the insulators. The aperture in one of the end insulators is adapted to receive a hollow rivet portion 47 of a circuit terminal 48. The end insulator 40 has a larger aperture than the end insulator 41 so that the upset end of the rivet 47 does not touch the end insulator 40. The upsetting of the rivet is done lightly and the rivet is held loosely on only the end insulator 41 so that there is no localized pressure on either of the end insulators.

Figure 1:
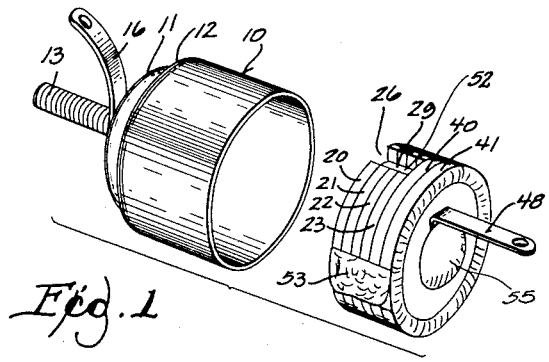
Figure 1 is an "exploded" perspective view of a metal cup with one terminal and of a stacked plate unit with one terminal, to be assembled into an electrical capacitor.
Figure 2:
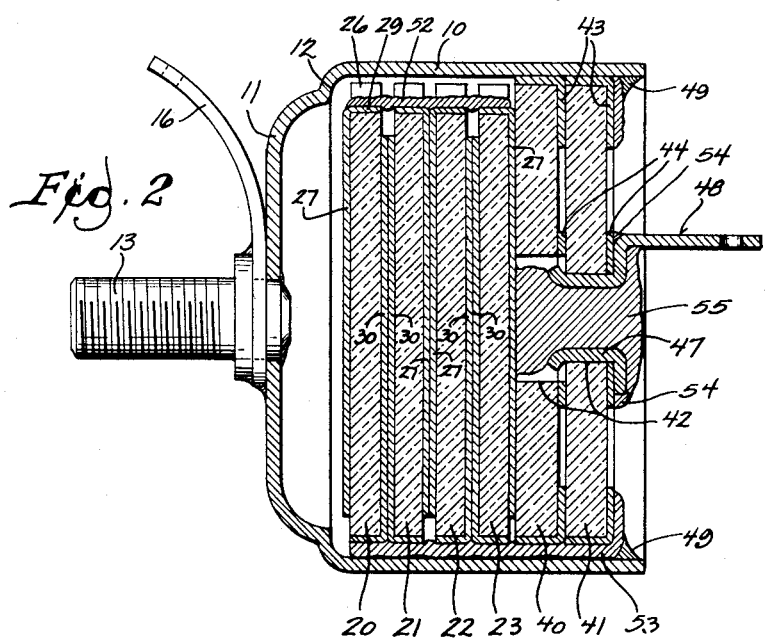
Figure 2 is a cross-sectional view on substantially a diametric plane through the capacitor.

The plates 20–23 are assembled with the notches 26 and the strip 29 of the coatings therein in alignment, and with the coating strips 31, 32 and 33, respectively, in alignment with similar strips on adjacent plates. The coatings 27 of the active plates are now either at the ends of the stack of the active plates or are in contacting position midway of such stack as shown in Figure 2 to form one set of conductive layers. The coatings 30 of two adjacent active plates are in contact and provide a second set of conductive layers co-acting with the dielectric plates and first set of coatings to form a capacitor. The two end insulators 40, 41 are also placed in position as shown in Figure 2.

The stack of plates is now joined by flowing solder into the notches 26 as indicated at 52 in Figure 2, to bond with the coating strips 29 of the first set of conductive layers and connect such layers electrically and to provide a sufficient mass of solder to act as a bar for mechanically joining the plates 20–23. Solder 53 is also applied to the aligned active plate coating strips 31, 32 and 33 and to the edge coatings 43 of the end insulators to provide electrical connections joining the second set of conductive layers at a plurality of points and for mechanically joining both the active plates and the end insulators into a mechanical unit. The coating strips 29, 31, 32 and 33 being equally spaced about the periphery of the plates and hence at approximately 90° spacings from the notch and one another, the stack of plates is now a unit in resisting shock and vibration.

The unitary stack of plates is inserted in the cup 10—13 to bring the outer side of the end insulator 41 slightly below the edge of the cup and solder 49 is flowed around the inside periphery of the cup to bond the cup with the peripheral coating 43 on the end insulator 41. Sufficient solder is used at 49 to hold the stack of plates in its position in the cup regardless of high accelerating and decelerating forces to which the capacitor may be subjected. The solder 49 is heated sufficiently so that it seals the edge of the end insulator 41 to the cup in gas-tight relation.

As the soldering of the plates and the end insulators into a unit and the joining of such unit to the cup are performed in close sequence, the entire capacitor is quite hot. Any moisture inside the cup vaporizes and the air expands through the hole in the rivet-terminal 47, 48. Solder 54 is now applied to fix the terminal 47, 48 to the central coating on the end insulator 41 which further heats the plate unit and air in the cup. While the entire structure is hot, solder 55 is flowed into the rivet 47 in sufficient quantity to substantially fill the larger central aperture in the plate 40 and to secure a bonding of the plate coating 27 at one end of the stack with the terminal 48. It will be understood that the entire structure may be further preheated before the solder 55 is applied, if desired to insure dryness within the device.

Elimination of the central hole heretofore used in all of the plates, for connection of one set of the conductive coatings such as the coatings 30, not only reduces losses in manufacture but greatly increases the resistance of the active plates to damage in use where they are subjected to shock and vibration. The notch 26 is more readily and completely filled with solder 52 than is true when such solder is flowed through a central passage and the solder is in better condition both to bond with the coating strips 29 extending into the notches 26 and to form a mechanical connector and tie between the plates, which may be of approximately the full cross-sectional area of the notch and extends its entire length.

The several solder strips 53 connect the coatings 30 to form the second set of conductive layers and provide mechanical bracing at a number of spaced locations about the periphery of the plates. The total area of the solder connectors 53 can easily be made approximately equal to the area of the solder bar 52 in the notch to provide ample mechanical strength resisting shock and vibrations and high accelerations and decelerations to which the present capacitors are subjected in some uses. Hence, such solder bar 52 and solder strips 53 cooperate in joining the active disks into and holding them as a single unit.

The provision of even very shallow notches at the plate edge portions 31, 32 and 33 would further increase the mechanical strength of the unit without materially complicating the manufacture of the ceramic pieces or increasing their cost and such construction is specifically brought within the scope of the present disclosure. If solder strips of sufficient area are used at the several locations 53 to approximately the area of the solder bar 52, it is unnecessary to provide any additional notches in the plates for securing adequate solder cross-sectional area for both electrical and mechanical connection of the conductive coatings to hold the plates in a stacked unit satisfactory for any use.

Electrical contact at the terminal 47, 48 is made only by the solder 55 which exerts little or negligible pressure on the end insulator 41. But forming and assembling the end insulators and terminal as described provides mechanical strength for holding the terminal in position even if the solder at 55 should be softened when a circuit lead is soldered to the terminal.

Elimination of the central hole in the active plates 20-23 increases the area available for coatings, more than is needed to compensate for the loss of area due to the notches. Hence, the total effective area of the capacitor coatings is such as to permit obtaining of the same capacitance values by use of four disks, as were heretofore obtained by use of six disks in which a central hole had to be provided. There is an additional saving in material cost and in labor reductions in preparing only a total of six disks as compared with at least a total of seven disks used in the prior capacitors of the cup-enclosed type. Even when two end insulators are used instead of only one as heretofore, the height of the present stack of plates is substantially less than heretofore for the same capaictance value and a substantially smaller unit results. Reduction in outside dimensions gives the used the possibility of applying the present unit in many places where space requirements have heretofore prevented the use of cup-enclosed capacitors.

Hence, the savings with the present construction include reduction in the number of ceramic pieces damaged during manufacture, reduction in the time required for connection of the metallic coatings forming the several sets of conductive layers, reduction in the number of capacitors in which there has been no bonding or inadequate bonding of the solder and the coatings, and increased mechanical connection of the plates to provide a more rigid unit.

The present invention is not limited to circular disks but may be applied to plates of any shape. Thus hexagonal or rectangular plates may be used in a cylindrical cup with the edges of the plates coacting with the cup in providing circular sector-like areas where the solder connections can be made. When the rectangular shaped plate unit and container are to be used on a given dimension transversely of the stack of plates, the capacity can be increased by $$\frac{1}{.7854}$$

(1.273) over a stack of circular plates having a diameter of the given dimension, or the entire device can be made smaller. In either shape of device, separate notches connecting the several sets of coatings would avoid contact with the container and permit bringing out both circuit terminals at the end member 41.

It will be understood also that the disks may be "clipped" to provide a straight peripheral edge portion with an area inside the former curved periphery of the disk where the solder 52 may be applied, rather than in a notch as shown at 26. A greater width of coating strip 29 (see Figures 3 and 4) may be used and is more readily applied by the usual production methods than the strip 29. The notches 26 may also be made of arcuate or "half-round" shape rather than rectangular which will also have the above advantages. Other advantages of the "clipped" or arcuate notch shape of the disk, are the greater ease of forming the dielectric itself with a minimum of imperfect disks and the avoidance of stress concentrations at sharp corners.

If desired, a single end insulator may be used so that the space occupied, e.g. by plate 40, may be used for an active plate. Also, the unoccupied space shown between the active plate 20 and the bottom of the cup 11 may be greatly reduced by special formation of such cup rather than employing a standard shape of cup as is shown in the drawing.

If desired, it is also possible to divide the conductive coatings into more than two sets, as by the use of another notch connecting some of the coatings only and to provide another terminal such as terminal 48. With the above construction, it is then possible to use the same capacitor for a number of different capacitance values in devices which will be subjected to rapid acceleration and deceleration, shock and vibration; by using various combinations of terminals as is already known.

The end insulators 40, 41 may be of any dielectric material and are preferably an inexpensive ceramic rather than the relatively expensive barium titanate and the like currently used in making the thinner active plates. If desired, coating 44 can be omitted from the end insulator 40, but the saving in time and material would be negligible as both the end members are handled by the same production steps.

I claim:

1. In an electric capacitor, a plurality of di-electric plates each having a notch in the edge thereof and free from perforations in the body thereof, electrically conductive coatings on the opposite sides of each plate and terminating short of the edges thereof, the coatings on each plate providing a plurality of strips extending over the edges of the plates in the same relative position on the plates and into the notch, the plates being stacked to align the strips and notches and position the coatings in sets spaced by the plates, an insulating end member on one end of the stack of plates, metallic coatings on the end member, solder joining aligned strips for electrically connecting the sets of coatings and mechanically joining the plates with one of the coatings on the end member to form a unit, an electrical terminal fixed on another of the coatings on the end member and electrically connected with one set of plate coatings, and a metal cup for receiving and retaining the plate-end member unit through the open end of the cup, and solder mechanically connecting the end member with the cup and co-acting with the end member in sealing the cup, the cup being electrically connected with another set of plate coatings as another electrical terminal.

2. In an electric capacitor, a plurality of di-electric plates severally having a notch in the edge thereof and free from perforations in the body thereof, electric conductive coatings on opposite sides of each plate and terminating short of the edges thereof, the coatings severally providing a strip extending into the plate notch and a plurality of strips extending over the edge of the plate, the plates being stacked to align the notches and the coating strips and to position coatings in sets spaced by di-electric, an insulating end member with a central aperture, a metallic coating about the periphery of the end member, a metallic coating around the aperture and spaced from the peripheral coating of the end member, solder strips severally joining the aligned coating strips for electrically connecting the coatings into sets and for mechanically joining the stacked plates with the end member into a unit, an electrical terminal fixed on the end member and electrically connected with one set of coatings on the plates, and a metal cup receiving the plate-end member unit and mechanically connected with the end member for closing the cup and forming a portion of the seal therefor.

3. In an electric capacitor, a plurality of di-electric plates severally having a notch in the edge thereof and free from perforations in the body thereof, an electric conductive coating on one side of each plate and with a strip extending into the notch, an electrically conductive coating on the other side of each plate and with a plurality of strips extending over the edge thereof, the plates being stacked to align the notches and the coating strips and to place the coatings in sets spaced by di-electric material, an insulating end member with a central aperture joined to the stack of plates, a metallic coating about the periphery and on the edge of the end member, a metallic coating around the aperture and spaced from the peripheral coating of the end member, solder joining the coating strips for electrically connecting sets of coatings and for mechanically joining the stacked plates with the end member into a unit, an electrical terminal fixed in the aperture in the end member and electrically connected with one set of coatings on the plates, a metal cup for receiving the plate-end member unit, and means mechanically connecting the cup with the end member and co-acting therewith to seal the cup, the cup providing an electric terminal for another set of coatings.

4. In an electric capacitor, a plurality of dielectric plates severally having a notch in the edge thereof and free from perforation in the body thereof, an electric conductive coating on one side of each plate and terminating short of the edge thereof and with a strip extending into the notch, an electrically conductive coating on the other side of each plate and terminating short of the edge thereof and with a plurality of strips extending over the edge thereof, the plates being stacked to align the notches and the coating strips and to place coatings in sets, an insulating end member with a central aperture and at one end of the stack of plates, a metal coating at the periphery of the end member, a metal coating on one side and around the aperture in the end member and spaced from the peripheral coating thereof, solder joining the aligned coating strips for electrically connecting the plate coatings into sets and joining the plates and end member into a mechanical unit, an electrical terminal fixed in the aperture in the end member and electrically connected with one set of plate coatings, and a metal cup receiving the plate-end member unit and mechanically connected therewith for closing the open end of the cup.

5. In an electric capacitor, a plurality of dielectric plates severally having a notch in the edges thereof and free from perforations in the body thereof, an electrically conductive coating on one side of each plate and terminating short of the plate edge and extending over the edge into the notch, an electrically conductive coating on the other side of each of the plates and terminating short of the plate edge and having a plurality of strips extending over the edge of the plates in spaced relation to one another, the strips being in the same relation position on the plates and being spaced around the periphery of the plates and substantially uniformly from the notch and from one another, the plates being stacked to align the coating strips, solder joining the coating strips for electrically connecting the coatings into sets, an insulating end member having a central aperture, metallic coatings on one side of the end member, the end member coatings being about the periphery and on the rim of and around the aperture in the end member and being spaced from each other, the solder on the said plurality of strips mechanically joining the stack of plates with the peripheral coating of the end member as a mechanical unit, an electric terminal extending from the end member, solder extending through the aperture in the end member and fixing the electric terminal thereon and electrically connecting the same with one set of the plate coatings, a metal cup receiving the plate-end unit, solder connecting the cup with the end member periphery coating for positioning the plate-end member unit in the cup and co-acting therewith to seal the cup, and another electrical terminal on the cup for the set of plate coatings electrically connected with the cup.

References Cited in the file of this patent

UNITED STATES PATENTS 2,348,693   Minnium _____ May 9, 1944

FOREIGN PATENTS 433,356   Italy _____ Apr. 7, 1948